United States Patent

[11] 3,629,965

| [72] | Inventor | William A. Heindl, Jr.<br>1171 Palmerston Road, Rochester, N.Y. 14618 |
|---|---|---|
| [21] | Appl. No. | 841,440 |
| [22] | Filed | July 14, 1969 |
| [45] | Patented | Dec. 28, 1971 |

[54] LIGHT BOX
2 Claims, 5 Drawing Figs.

| [52] | U.S. Cl. | 40/63 A |
|---|---|---|
| [51] | Int. Cl. | G09f 11/30 |
| [50] | Field of Search | 40/63, 64, 106.1, 106.51, 106.52, 106.53; 272/8.5, 8 M, 8 D, 10; 353/30, 35, 62, 97 |

[56] References Cited
UNITED STATES PATENTS

| 1,387,631 | 8/1921 | Tibbles | 40/106.52 |
| 1,652,636 | 12/1927 | Paul | 40/106.52 X |
| 2,534,637 | 12/1950 | Sussin | 40/106.1 |

*Primary Examiner*—Jerome Schnall
*Assistant Examiner*—L. Anten
*Attorney*—B. Edward Shlesinger ABSTRACT: A conventional transparency is removably mounted in an opening in the front of a box containing a translucent shade, which is mounted to pivot about its upper edge toward and away from the transparency, and to closed and open positions, respectively. A first lamp adjacent the lower edge of the shade illuminates the transparency when the shade is in its open position, and a second lamp rearward of the shade may be energized to superimpose an image of the shade onto the transparency, when the shade is closed. Two such shades pivoted relative to one another may be mounted in the box as an alternate construction.

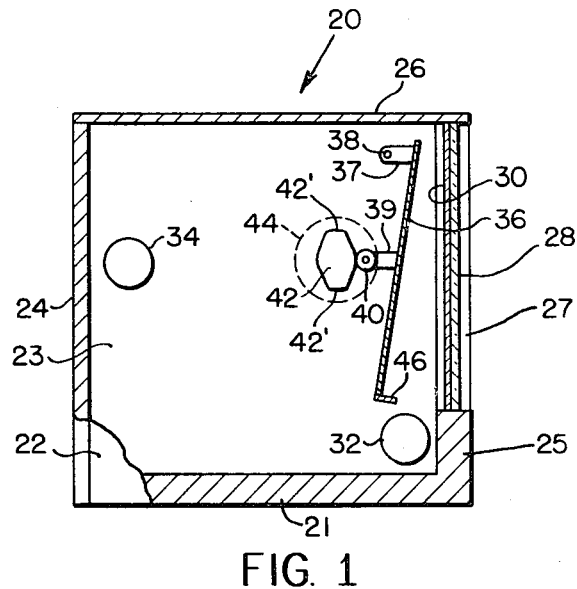

LIGHT BOX

This invention relates to light boxes, and more particularly to a light box of a type which is adapted to display multicolored transparencies.

Light boxes for housing and illuminating colored transparencies have long been employed in various forms of advertising. A slide viewer containing a battery-operated bulb is one of the simplest forms of light boxes, and is commonly employed for viewing colored slides of the type taken with, for example, a 35 mm. camera. For advertising purposes, however, it is often desirable to use a somewhat more sophisticated light box containing, for example, a transparency with an image thereon, a light source positioned rearwardly of the transparency, and a revolving multicolored disc, or the like, positioned between the transparency and the light source, so that the color of the background lighting for the transparency will vary constantly.

It is an object of this invention to provide an improved light box, which is capable of subjecting a transparency to various configurations and shades of background lighting.

Another object of this invention is to provide a novel light box, which is substantially more versatile than prior such boxes, and which nevertheless is relatively inexpensive to manufacture and operate.

A still further object of this invention is to provide an improved light box having one or more movable shades for changing the background illumination for the transparency illuminated by the box.

Other objects of the invention will be apparent hereinafter from the specification and from the recital of the appended claims, particularly when read in conjunction with the accompanying drawing:

FIG. 1 is a side elevational view of a light box made in accordance with one embodiment of this invention, portions of the box being cut away and shown in section;

FIG. 2 is a plan view of this box with its top removed and with portions of its movable light shade cut away for purposes of illustration;

FIG. 3 is a perspective view illustrating schematically one type of shade and transparency which can be used with this box;

FIG. 4 is a perspective view of still another combination of shade and transparency which can be used with this box; and FIG. 5 is a fragmentary sectional view similar to FIG. 1, but showing a modified light box made in accordance with a second embodiment of this invention.

Referring now to the drawing by numerals of reference, and first to FIGS. 1 and 2, 20 denotes generally a hollow, rectangular light box comprising a flat bottom 21, spaced parallel sidewalls 23 and 23, a vertical rear wall 24, and a front wall 25, and a removable cover 26. Removably mounted in a rectangular opening 27 in the front wall 25 is a large, rectangular, transparent plate 28, opposite sides of which are slidably housed in registering, vertical slots 29 that are formed in wall 25 at opposite sides of the opening 27.

Secured to the rear face of the plate 28 to be mounted thereby removably across the opening 27 in wall 25 is a conventional, plastic transparency 30. This transparency has on its rear face a translucent material, which diffuses the background lighting that is directed onto the rear of the transparency as described below.

Mounted at opposite ends thereof in conventional sockets (not illustrated) fastened to the inside faces of the sidewalls 22 and 23 adjacent the lower edges thereof, and extending transversely between the sidewalls just rearwardly of the front wall 25, is an elongate lamp 32. This lamp serves as the primary source of illumination for the transparency 30. A second, like lamp 34 is similarly mounted to extend transversely between the sidewalls 22 and 23 above and rearwardly of the lamp 32, and may be used in certain cases to supplement the light from lamp 32. These lamps may be controlled by separate, manually operated switches that may be mounted at convenient locations on, or remote from, the box 20.

Pivotally mounted in the box 20 just rearwardly of the opening 27 in wall 25 is a relatively large, rectangular shade 36. Two spaced brackets 37, which project rearwardly from the upper corners of the shade 36, are pivotally mounted on a pair of aligned pins 38 which project from the insides of the sidewalls 22 and 23 adjacent the upper edges thereof. A further bracket 39, which projects rearwardly from the shade 36 adjacent one side thereof, and substantially medially of the upper and lower edges of the shade, carries a roller follower 40, which has rolling engagement with the periphery of the cam 42. Cam 42 is fastened on the armature shaft 43 of a motor 44, which is fastened to the outside of the sidewall 23, so that its shaft 43 rotates parallel to the pivotal axis of shade 36.

Fastened to the lower edge of the shade 36, and projecting at right angles therefrom forwardly over the lamp 32 is a relatively narrow strip 46 of plastic, which may be opaque or translucent, and if translucent may be tinted or otherwise colored as desired.

The pins 38 and brackets 37 support the shade 36 in such manner that the weight of the shade constantly urges the roller follower 40 into engagement with the cam 42. As shown more clearly in FIG. 1, this cam has thereon diametrally opposed lobes 42' which cause the shade 36 to be pivoted slightly forwardly from its rear or open position as illustrated in FIG. 1, or counterclockwise about the coaxial pivot pins 38, twice for each revolution of the cam.

When the shade 36 is in its rear position, the plastic strip 46 on the lower edge of the shade is positioned almost rearwardly of the lamp 32, or at least far enough rearwardly of its centerline so that when lamp 32 is illuminated, it will function in the usual and normal manner to illuminate the transparency 30 carried by the plate 28. However, when one or the other of the lobes on the cam 42 causes the shade 36 to be swung forwardly from the position illustrated in FIG. 1 to a closed position in closely spaced, parallel relation to the transparency 30, the strip 46 will be moved to a position in which it overlies the lower marginal edge of the opening 27 in the front wall 25. Consequently, if the strip 46 is a translucent material tinted a particular color, this color will be transmitted by the illumination from the lamp 32 onto the back of transparency 30 each time strip 46 passes over lamp 32, thus causing the image on the transparency 30 to be changed accordingly. Moreover, this change will be either rapid or gradual, depending upon the speed at which the shade 36 is oscillated by the cam 42.

The shade 36 may be made from either an opaque or translucent material. If the shade is opaque, it will, when in its rear position, allow light from lamp 32 to illuminate the transparency 30, but when in its advanced or closed position, it will block off from the transparency substantially all light from lamp 32. The scene depicted by the transparency will thus be subjected to the illusion of passing from daylight to darkness, and vice versa. Moreover, by properly tinting the strip 46, the latter will cause the background lighting to convey the impression of a softly colored dawn or dusk as the strip passes over lamp 32.

If the shade 36 is made of a translucent material, one or more thin plastic films depicting different scenes, or in different shapes and/or colors or with printing thereon, may be secured to its face to be superimposed on the transparency by background light from lamp 32, which illuminates both the shade 36 and the transparency 30, when the shade is in its closed position. On the other hand, when shade 36 is open, or in its rear position as shown in FIG. 1, light from lamp 32 is reflected off of the inclined front face of shade 36 and onto transparency 30 to illuminate solely the latter.

FIG. 3, for example, shows the shade 36 in its open position, and having on its face images of clouds C. At this time some light from lamp 32 reflects off the face of shade 36 and illuminates the skyline scene on transparency 30, but the clouds are not superimposed onto the transparency. However, when the shade 36 moves to its closed position toward the transparency 30, light from lamp 32 is directed onto the back of translucent shade 36 thus to illuminate the images on both the shade and the transparency, and consequently superimposing images of the clouds C onto the skyline image of transparency 30. If the light from lamp 32 is not sufficient to illuminate both the shade and transparency, when the former is closed, the secondary lamp 34 may be energized to provide additional illumination.

Instead of superimposing additional images onto the transparency, the shade can be used to spotlight or illuminate selected areas only of the transparency, as for example the images of the portholes of the ship forming the transparency 30' in FIG. 4. In this embodiment the shade 36' has therethrough a plurality of spaced holes 50 disposed to register with the portholes on the ship image when the shade 36' is swung to its closed position. For best results the shade 36' is made at least as thick as the diameter of the largest opening 50, so that light passing through the opening, when the shade is closed, will not be diffused unduly.

Referring now to the modified light box 20' as shown in FIG. 5, wherein like numerals are employed to designate elements similar to those employed in the light box of FIGS. 1 and 2, 66 denotes a first light shade, which is rectangular in configuration, and which is pivoted at its upper ends by brackets 37 to pins 38 in a manner similar to shade 36 of the first-described embodiment. Hinged along its lower edge as at 67 to the lower edge of shade 66, and projecting upwardly therefrom behind shade 66 and forwardly of cam 42, is a second shade 68, which is similar in configuration to shade 66. Two spaced brackets 69, only one of which is illustrated in FIG. 5, project rearwardly from the upper corners of shade 68, and are pivotally connected to a pair of aligned pins 70 that are mounted for limited vertical movement in arcuate slots 72 formed in the sidewalls 22 and 23, respectively. A roller follower 74 carried by shade 68 has rolling contact with cam 42 so that, when rotated, the latter will impart pivotal movement to the shades 66 and 68.

Instead of being manually operable, lamp 34 in this embodiment is automatically operated. Mounted on the inside of wall 23 to have its operating plunger register with the adjacent bracket 69 on shade 68 is a conventional, normally closed micro switch 76. This switch is connected in series circuit with lamp 34. When the shade 68 is in its rearmost position, its bracket 69 adjacent wall 23 engages the plunger of switch 76 to hold the latter open, thus to deenergized lamp 34. However, as shade 68 swings forwardly, its last-named bracket 69 moves downwardly to allow switch 76 to close and energize lamp 34.

Preferably the shades 66 and 68 are made of a translucent plastic and have different designs thereon. For instance, shade 66 may have on its face differently colored or shaded vertical lines or ribs, and similar horizontal lines or ribs may be formed on the face of the second shade 68. When cam 42 rotates, the two shades are pivoted about pins 38, with the rear or second shade 68 also being pivoted slightly relative to shade 66 about the axis of hinge 67. This relative movement between the shades also produces a slight vertical movement in shade 68, for which reason the pins 70 are guided for limited vertical movement in slots 72.

This combination of pivotal and vertical movement of shade 68 causes the image thereon, as represented, for example, by the above-noted horizontal lines or ribs, to be movingly superimposed on that of the shade 66, whenever the rear or secondary lamp 34 is illuminated. As the shades 66 and 68 are swung forwardly over lamp 32 from their rearmost positions as shown in FIG. 5, lamp 34 is energized through switch 76 to supplement lamp 32, and images from both of the shades are superimposed onto the transparency 30 (not illustrated) mounted in the front of box 20'. If desired, however, this transparency 30 can be removed or replaced by a plain translucent screen, or the like, so that the superimposed images of the shades 66 and 68 can be viewed directly from the front of box 20'.

From the foregoing it will be apparent that applicant had developed a relatively simple but extremely versatile light box, which can be used to impart the illusion of the passage of time to a scene depicted by a conventional transparency, or which can be used to emphasize or modify selected portions of the screen on the transparency. Moreover, a light box of this type described is particularly suitable as a vehicle for subliminal advertising. For example, by placing printed matter, such as a trademark, on the face of shade 36, and by adding a conventional, periodically energized strobe light to box 20 just forwardly of lamp 34, the printed matter can be subtly and periodically superimposed on the transparency 30. Alternatively, of course, the strobe light could be substituted in place of lamp 34.

Preferably, when the lamps 32 and 34 are to be used for long periods without interruption, they are of the fluorescent variety so as to minimize the development of heat in the box during operation of the lamps. However, where lamp 34 is controlled by switch 76 to be turned on and off once per oscillation of shade 68, it preferably is of the incandescent variety. Moreover, while the invention was described in conjunction with the use of a multicolored transparency 30, it will be appreciated that a black and white transparency may be used instead, if desired. Also, if desired, a spring may be attached in any conventional manner to shade 36 or 68 to assist gravity in maintaining the associated roller followers 40 or 74 engaged with cam 42.

Having thus described my invention, what I claim is:

1. A light box for illuminating transparencies, comprising
   a housing having an opening in one side thereof,
   means for removably mounting a transparency across said opening,
   a light source mounted in said housing to illuminate said transparency,
   motor-operated drive means in said housing,
   a generally rigid shade pivotally mounted in said housing rearwardly of said transparency and operatively connected to said drive means for pivotal movement thereby toward and away from said transparency, and
   means including said shade operative to superimpose selected images onto said transparency when said shade is pivoted toward said transparency,
   said shade having therethrough a plurality of spaced openings for focusing light from said source onto selected areas of said transparency, when said shade is pivoted toward said transparency, and
   said shade being at least as thick as the diameter of the largest of said openings.

2. A light box for illuminating transparencies, comprising
   a housing having an opening in one side thereof,
   means for removably mounting a transparency transversely across said opening,
   a generally rigid shade mounted in said housing rearwardly of said opening for pivotal movement between a first position in which said shade is disposed in spaced, parallel, confronting relation to said transparency, and a second position in which said shade is disposed in a plane inclined to said transparency with one edge of said shade spaced from said transparency a greater distance than the opposite edge thereof,
   drive means in said housing operatively connected to said shade to pivot said shade between its first and second positions, and
   a lamp mounted in said housing adjacent said one edge of said shade and positioned to direct light between said transparency and said shade, when said shade is in said second position, and to direct light onto the side of said shade remote from said transparency, when said shade is in said first position,
   and shade being opaque and having therethrough a plurality of openings for focusing light from said lamp onto selected areas of said transparency, when said shade is in said first position.

* * * * *